F. A. R., H. C. & O. L. FIEBACH.
CUTTER FOR CORN HARVESTERS.
APPLICATION FILED MAR. 18, 1910.

965,134.

Patented July 19, 1910.

WITNESSES.

INVENTORS.
Frank A. R., Henry C. & Otto L. Fiebach,
By Benedict, Morsell & Caldwell
ATTORNEYS.

UNITED STATES PATENT OFFICE.

FRANK A. R. FIEBACH, HENRY C. FIEBACH, AND OTTO L. FIEBACH, OF LAKEMILLS, WISCONSIN.

CUTTER FOR CORN-HARVESTERS.

965,134.  Specification of Letters Patent.  Patented July 19, 1910.

Application filed March 18, 1910.  Serial No. 550,187.

*To all whom it may concern:*

Be it known that we, FRANK A. R. FIEBACH, HENRY C. FIEBACH, and OTTO L. FIEBACH, residing in Lakemills, in the county of Jefferson and State of Wisconsin, have invented new and useful Improvements in Cutters for Corn-Harvesters, of which the following is a description, reference being had to the accompanying drawings, which are a part of this specification.

This invention has for its object to provide a cutter for corn harvesters which will be simple in its construction and durable and efficient in its operation.

The invention principally consists in a cutter knife adapted to be swung by a long arm lever connected by a connecting rod with a traction driven crank.

With the above and other objects in view the invention consists in the cutter for corn harvesters, as herein claimed, and all equivalents.

Figure 1:
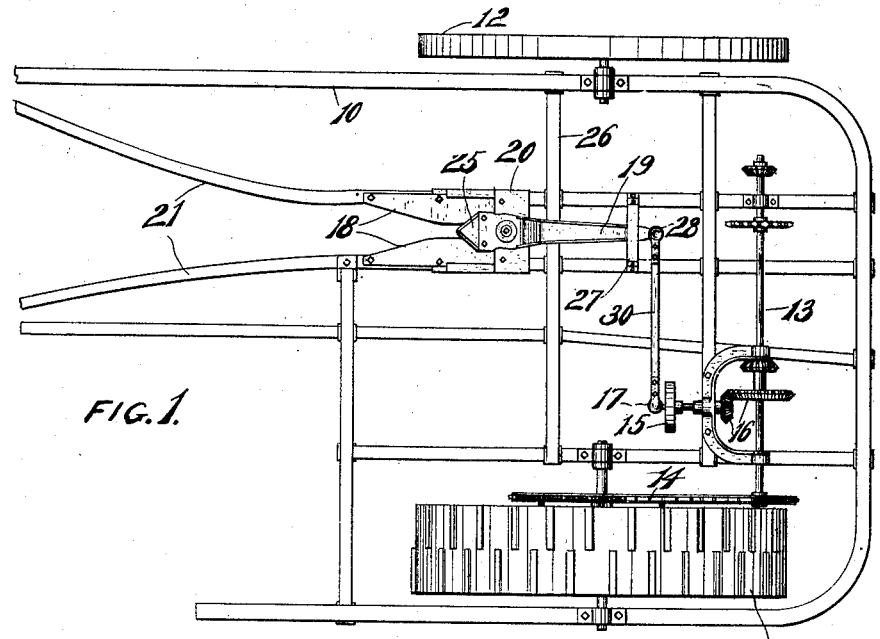
Figure 4:
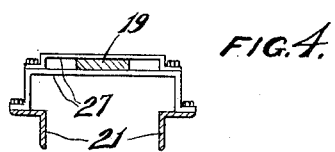
Figure 2:
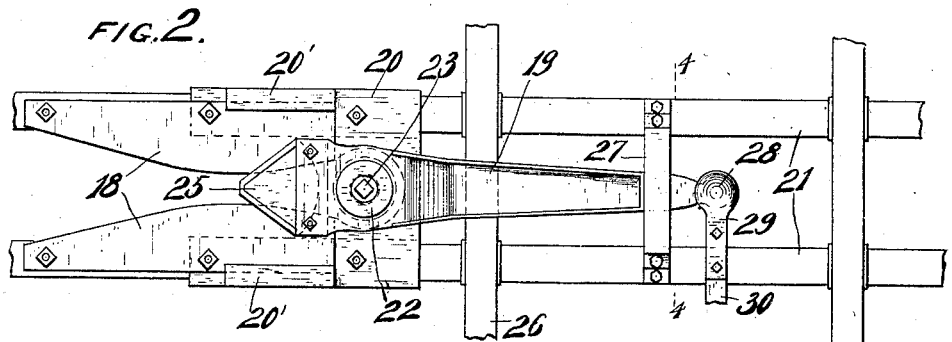
Figure 3:
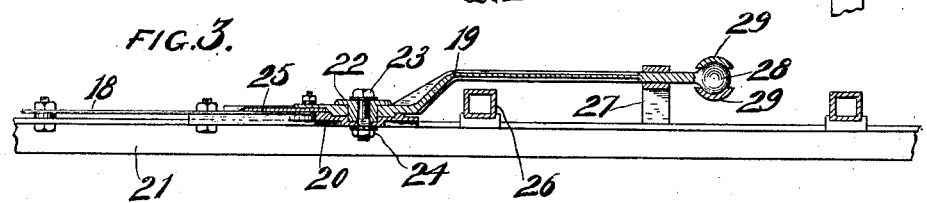

Referring to the accompanying drawings in which like characters of reference indicate the same parts in the different views: Figure 1 is a plan view of a corn harvester frame provided with a cutter constructed in accordance with this invention; Fig. 2 is a plan view of the cutter mechanism alone; Fig. 3 is a central longitudinal sectional view thereof; and, Fig. 4 is a transverse sectional view on the plane of line 4—4 of Fig. 2.

In these drawings 10 indicates the main frame of usual construction having the main wheel 11 and the grain wheel 12 mounted thereon. A countershaft 13 is journaled across the main frame and has a chain drive connection 14 with the main wheel 11 in the ordinary manner and the crank disk 15 is geared thereto by bevel gears 16 and carries a ball shaped crank or wrist pin 17 for driving the cutter. The side knives 18 of the cutter are arranged as usual, but instead of a reciprocating slide for carrying the knife, the present invention provides a lever 19 which is pivotally mounted on a bridge piece 20 which bridges across the converging divider portions 21 of the main frame which form the throat-way leading to the cutter. The bridge piece 20 extends forwardly beneath the side knives and is provided with flanges 20' which surround the outer edges of the side knives to prevent their spreading.

The lever 19 is provided with a circular boss on its under side which is countersunk within a correspondingly shaped recess on top of the bridge piece 20, and a flanged bushing 22 which passes through the pivotal opening of the lever 19 and forms the fulcrum therefor projects beneath the bottom of said circular boss and is correspondingly countersunk within a similar concentric recess in the bridge piece 20, the pivot bolt 23 passing through said bushing and the bridge piece 20 with its nut 24 bearing against the under side of said bridge piece. The front end of the lever 19 is undercut to receive the section knife 25 which bears against and swings across the face of the side knives 18 during the oscillating movements of the lever 19. The rearwardly extending arm of the lever 19, first bends upwardly to avoid the cross piece 26 of the frame, and then passes through a slot in an arched guide 27 extending across the parts of the frame in extension of the divider portions 21, and finally terminates in a ball 28 which fits between a pair of socket plates 29 on a connecting rod 30, which similarly connects with the ball shaped wrist pin on the crank disk 15. These ball and socket connections between the connecting rod 30 and the cutter lever and the wrist pin respectively constitute universal joints which will permit of the rotary movements of the wrist pin and the oscillating movements of the cutter lever without binding, and said connecting rod serves to convert the rotary motion of the wrist pin into the oscillating movements of the cutter lever so as to produce the swinging of the section knife 25 back and forth across the throat of the machine to sever the corn stalks with a shearing cut by coöperating with the side knives 18.

By means of this invention the excessive friction due to the use of sliding knife bars is avoided and a direct driving connection for the section knife is afforded, which, on account of the great leverage of the cutter lever 19, offers very little resistance to the operation. Another material advantage for this pivoted cutter over the reciprocating cutters is, that because of the movement of the section knife about a fixed pivotal center, it requires a shorter travel to complete its shearing action with relation to the stationary side knives, and further, inasmuch as the bearing parts thereof remain constantly covered and are not exposed to receive dirt, as with reciprocating knives, it remains well lubricated and is less subject to wear, besides offering less resistance to the operation of the machine.

What we claim as new and desire to secure by Letters Patent is—

A cutter for corn harvesters, comprising a frame forming a converging throat-way, side knives on the frame at the sides of the throat-way, a bridge piece secured to the frame across the throat-way, flanges on the bridge piece engaging the side knives for preventing their spreading, a lever, a circular boss on the under side of the lever, a flanged bushing passing through an opening in the lever and projecting beneath the circular boss concentric therewith, there being correspondingly shaped recesses in the bridge piece to receive the circular boss and the projecting end of the bushing, a pivot bolt passing through the bushing and the bridge piece, a section knife carried by the lever and bearing on the side knives, and driving means for oscillating the lever.

In testimony whereof, we affix our signatures, in presence of two witnesses.

FRANK A. R. FIEBACH.
HENRY C. FIEBACH.
OTTO L. FIEBACH.

Witnesses:
E. C. BROWN,
O. B. COOMBE.